US008607651B2

(12) United States Patent
Eventoff

(10) Patent No.: US 8,607,651 B2
(45) Date of Patent: Dec. 17, 2013

(54) HYBRID CAPACITIVE FORCE SENSORS

(71) Applicant: Sensitronics, LLC, Bow, WA (US)

(72) Inventor: Franklin N. Eventoff, Bow, WA (US)

(73) Assignee: Sensitronics, LLC, Bow, WA (US)

( * ) Notice: Subject to any disclaimer, the term of this patent is extended or adjusted under 35 U.S.C. 154(b) by 0 days.

(21) Appl. No.: 13/632,571

(22) Filed: Oct. 1, 2012

(65) Prior Publication Data

US 2013/0167663 A1    Jul. 4, 2013

Related U.S. Application Data

(60) Provisional application No. 61/541,608, filed on Sep. 30, 2011, provisional application No. 61/565,847, filed on Dec. 1, 2011.

(51) Int. Cl.
    *G01L 1/04*    (2006.01)
(52) U.S. Cl.
    USPC ............................ 73/862.627; 73/862.041
(58) Field of Classification Search
    USPC ............... 73/760, 862.041–862.046, 862.627
    See application file for complete search history.

(56) References Cited

U.S. PATENT DOCUMENTS

| | | | |
|---|---|---|---|
| 4,235,141 A | 11/1980 | Eventoff | |
| 4,268,815 A | 5/1981 | Eventoff et al. | |
| 4,276,538 A | 6/1981 | Eventoff et al. | |
| 4,301,337 A | 11/1981 | Eventoff | |
| 4,314,227 A | 2/1982 | Eventoff | |
| 4,314,228 A | 2/1982 | Eventoff | |
| 4,315,238 A | 2/1982 | Eventoff | |
| 4,451,714 A | 5/1984 | Eventoff | |
| 4,489,302 A | 12/1984 | Eventoff | |
| 4,739,299 A | 4/1988 | Eventoff et al. | |
| 4,810,992 A | 3/1989 | Eventoff | |
| 4,830,623 A * | 5/1989 | Owens et al. | 439/71 |
| 5,159,159 A * | 10/1992 | Asher | 178/18.05 |
| 6,073,497 A | 6/2000 | Jiang et al. | |
| 6,567,102 B2 | 5/2003 | Kung | |
| 6,964,205 B2 * | 11/2005 | Papakostas et al. | 73/862.046 |
| 7,145,253 B1 * | 12/2006 | Kim et al. | 257/790 |
| 7,511,702 B2 * | 3/2009 | Hotelling | 345/173 |
| 8,169,332 B2 | 5/2012 | Son | |
| 8,209,861 B2 | 7/2012 | Long et al. | |
| 8,228,306 B2 | 7/2012 | Long et al. | |
| 8,274,486 B2 | 9/2012 | Barbier et al. | |
| 2003/0205450 A1 | 11/2003 | Divigalpitiya et al. | |
| 2004/0130528 A1 * | 7/2004 | Baker et al. | 345/161 |
| 2005/0219222 A1 | 10/2005 | Johnson et al. | |
| 2006/0111008 A1 | 5/2006 | Arthur et al. | |

(Continued)

*Primary Examiner* — Max Noori
(74) *Attorney, Agent, or Firm* — K. David Crockett, Esq.; Paul J. Backofen, Esq.; Crockett & Crockett, PC

(57) ABSTRACT

Hybrid force sensitive input devices are formed as a membrane assembly that is capable of detecting capacitive presence near the sensor surface as well as pressure inputs and varying applications of pressure to the sensor surface. As a capacitive sensor, the electrical charge of a user's hand, finger or other extremity is sensed by the conductive layers of the sensor as a function of the input extremity's location and proximity to the sensor surface. As a force sensor, a user's input contact with the sensor surface is detectable when conductive elements on apposing substrates are forced into contact when input force is applied. Increasing the applied force increases the number of conductive particles making contact allowing the electrons to travel from one conductive trace on a first substrate through the contacting conductive patches to a perpendicular conductive trace on a second substrate.

6 Claims, 3 Drawing Sheets

(56) References Cited

U.S. PATENT DOCUMENTS

| | | |
|---|---|---|
| 2007/0198926 A1 | 8/2007 | Joguet et al. |
| 2008/0192014 A1 | 8/2008 | Kent et al. |
| 2008/0303802 A1 | 12/2008 | Destura et al. |
| 2009/0091551 A1 | 4/2009 | Hotelling et al. |
| 2009/0237374 A1 | 9/2009 | Li et al. |
| 2009/0256817 A1 | 10/2009 | Perlin et al. |
| 2009/0278815 A1 | 11/2009 | Li et al. |
| 2010/0037709 A1 | 2/2010 | Yeh et al. |
| 2010/0040771 A1 | 2/2010 | Kadono |
| 2010/0117974 A1 | 5/2010 | Joguet et al. |
| 2010/0164901 A1 | 7/2010 | Chen et al. |
| 2010/0220075 A1 | 9/2010 | Kuo et al. |
| 2010/0308844 A1 | 12/2010 | Day et al. |
| 2011/0050588 A1 | 3/2011 | Li et al. |
| 2011/0214728 A1 | 9/2011 | Veerasamy |
| 2011/0227836 A1 | 9/2011 | Li et al. |
| 2011/0273394 A1 | 11/2011 | Young et al. |
| 2012/0026124 A1 | 2/2012 | Li et al. |
| 2012/0097009 A1 | 4/2012 | Eventoff et al. |

\* cited by examiner

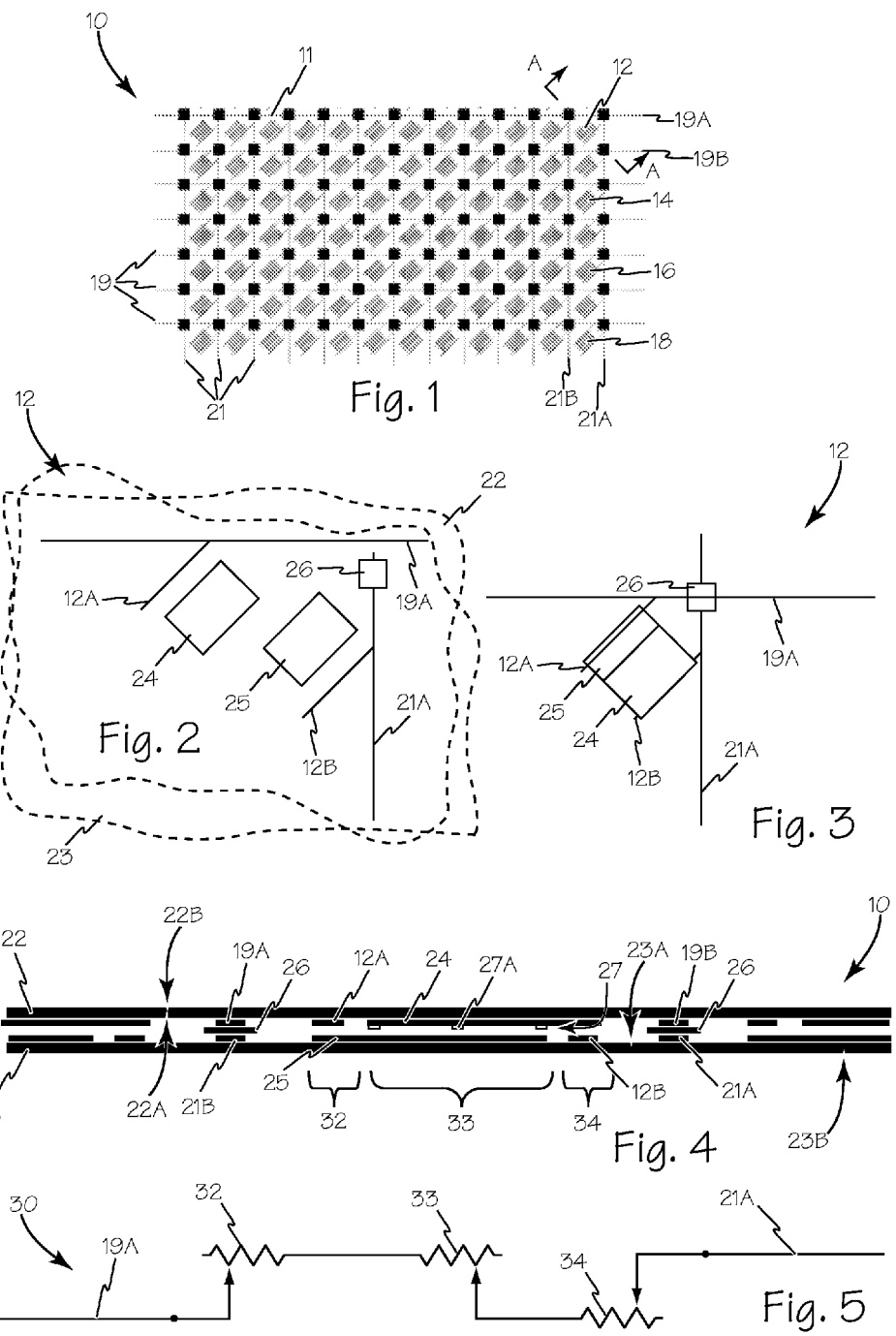

HYBRID CAPACITIVE FORCE SENSORS

RELATED APPLICATIONS

This application claims priority from U.S. Provisional Patent Application 61/541,608 filed Sep. 30, 2011 and from U.S. Provisional Patent Application 61/565,847 filed Dec. 1, 2011.

FIELD OF THE INVENTIONS

The present invention relates generally to the field of analog input sensors and more specifically to the field of hybrid capacitive and force sensing resistor input sensors for electronic devices.

BACKGROUND OF THE INVENTIONS

Modern interface controls are integrating electronic touch sensors to detect inputs. Conventional sensor surfaces based on force sensing resistors are generally opaque due to the materials used and the density of material necessary to achieve a functional sensor.

SUMMARY

The method and apparatus for hybrid capacitive force sensitive input devices disclosed below are formed as a membrane assembly that is capable of detecting capacitive presence near the sensor surface as well as pressure inputs and quantifying varying applications of pressure to the sensor surface. A hybrid capacitive force sensing membrane assembly is formed with conductive particles by using two sheets of Mylar (PET) or other clear substrate coated with oriented patches of conductive particles on apposing surface of the parallel substrates along with an array of parallel conductors on each substrate. As a capacitive sensor, the electrical charge of a user's hand, finger or other extremity is sensed by the conductive layers of the sensor as a function of the input extremity's location and proximity to the sensor surface. As a force sensor, a user's input contact with the sensor surface is detectable when conductive elements on apposing substrates are forced into contact when the input force is applied. Increasing the applied force increases the area of contact between the substrates increasing conductance and increasing the number of conductive particles in the force sensing resistor elements making contact allowing the electrons to travel from one conductive trace on a first substrate through the contacting CNT patches to a perpendicular conductive trace on a second substrate.

The conductive traces and patches discussed below will generally refer to PEDOT as the deposited material. Any suitable conductive material may be used in place or PEDOT in this disclosure such as carbon allotropes such as carbon nanotubes (CNT) and graphene or conductive polymers such as Poly(3,4-ethylenedioxythiophene) or PEDOT (or sometimes PEDT) or metal oxides such as zinc oxide or indium tin oxide (ITO), indium zinc oxide (IZO), aluminum zinc oxide (AZO) or gallium zinc oxide (GZO).

Combining capacitive and force sensing resistor sensors provides a hybrid sensor with a z-axis depth of field sensitivity permitting gesture sensing with capacitance reacting to the approaching finger activator, then the FSR responds to applied force of the finger and capacitive sensing again responds as the activating finger is withdrawn from the sensor surface.

The method and apparatus for transparent force sensitive input devices disclosed below are formed as a membrane that is capable of detecting pressure inputs and varying applications of pressure. A transparent force sensing membrane is formed with carbon nanotubes by using two sheet of Mylar (PET) or other clear substrate coated with oriented patches of conductive polymer, micro-particle deposits or carbon nanotubes (CNT).

The coating process includes conductive particles or micro-particles such as zinc oxide or other suitable materials or carbon nanotubes mixed in an aqueous or other solution and deposited using any suitable technique such as aerosol deposition. The aqueous solution may be an alcohol carrier or other suitable liquid and may also include one or more additives such as a suitable ionomer to bind the CNT to prevent the CNT from passing through human skin or lung membranes. The clarity or light transmission of a transparent force sensing membrane is rated at about 92%, which to the human eye seems like looking through clear glass. Higher resistance of the conductive particle patches improves the light transmission through the sensor. Alternatively, conductive polymer patches such as PEDOT or other suitably conductive polymer may be used to form force sensing resistor (FSR) patches.

A transparent force sensing membrane is made by depositing conductive particles, such as CNT, in FSR elements such as oriented patches on apposing surface of parallel substrates. A user's input contact with the sensor surface is detectable when the conductive particles or tubes or polymer elements in apposing patches are forced into contact with each other and with the conductive traces when the input force is applied. The more force, the more conductive elements make contact allowing the electrons to travel from one conductive trace through the contacting CNT patches to a perpendicular conductive trace. Higher force also increases the contact area between the substrates that also increases conductance between conductive elements in contact on each substrate.

A small area of contact between apposing patches and their conductive traces is made when an actuator (the device that touched the sensor surface) such as a human finger makes initial contact with the sensor. As force is increased the area of contact increases bringing more particles into play and thus increasing the conductivity of the device.

A transparent force sensing membrane is made using two parallel substrates. A first substrate has rows and columns of conductive traces formed on a first side of the substrate. Where the column traces intersect the row traces, the column traces are interrupted by forming an electrical connection through the substrate from the first side to the second side and crossing the row trace and then again forming an electrical connection from the second side of the substrate to the first side of the substrate and connecting with the interrupted column trace.

Alternatively, a dielectric or insulating pad can be printed over the row traces allowing an uninterrupted column trace to be deposited perpendicular to the row traces over the dielectric or insulating pads with a top coat of a suitable conductor such as silver. Parallel to the column traces are short conductor leg traces. On the first side of the second substrate are deposited FSR elements such as patches of conductive material such as CNT. When the substrates are oriented parallel with the first sides in apposition, the patches of the conductive material align over a column trace and a short leg trace such that pressure on the membrane causes one or more conductive patches to engage a column trace and a short leg trace forming a force sensitive resistance circuit.

A trampoline sensor as described below provides a hybrid force sensing membrane which is secured along its perimeter over on opening sized and shaped to correspond to the size and shape of the force sensing membrane. A user applying force input to the sensor membrane does not encounter a hard surface beneath the sensor membrane. Instead the sensor membrane operates like a trampoline providing an increased travel when a force is applied with no hard feel at the end of the sensor travel. A trampoline sensor may also include hybrid capacitive input sensing as described below.

Force-sensing resistors date back to Eventoff patents, 4,314,227, 4,314,228, etc. which disclose two basic FSR configurations, the "ShuntMode and ThruMode." The largest percentage of parts manufactured are ShuntMode devices. Both configurations are constructed with various formulations of force-sensing-resistor inks. Typically the solvent based ink is screen printed and cured on a substrate (PET/Mylar) to makes a force-sensing resistor element.

These and other features and advantages will become further apparent from the detailed description and accompanying figures that follow. In the figures and description, numerals indicate the various features of the disclosure, like numerals referring to like features throughout both the drawings and the description.

BRIEF DESCRIPTION OF THE DRAWINGS

FIG. 1 is a schematic of a portion of a transparent force sensor array.

FIG. 2 is an exploded block diagram of the elements of a force sensing element of the force sensor array of FIG. 1.

FIG. 3 is an oriented layout diagram of the elements of FIG. 2.

FIG. 4 is a cross section diagram of the force sensor assembly including the force sensing array of FIG. 1 taken along A-A.

FIG. 5 is a schematic circuit diagram of a force sensing assembly.

DETAILED DESCRIPTION OF THE INVENTIONS

Figure 6:
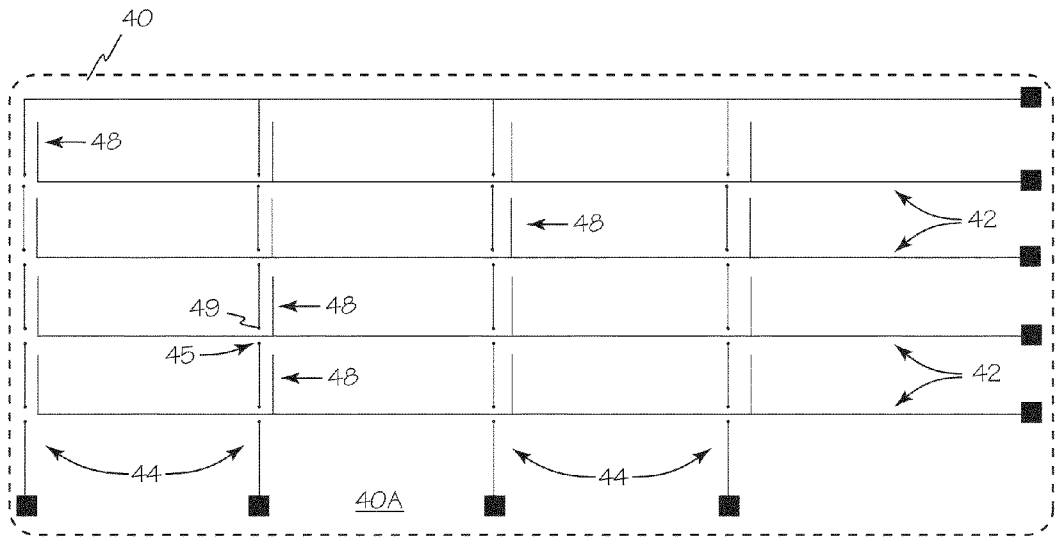
FIG. 6 is a layout diagram of a portion of a single layer conductive trace arrangement.
Figure 7:
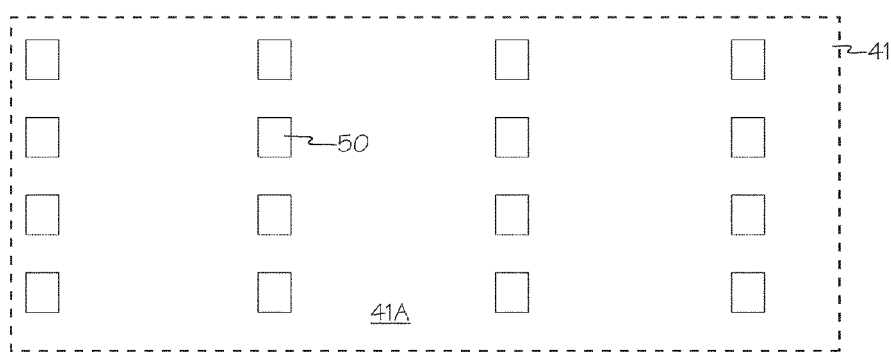
FIG. 7 is a layout diagram of conductive patches for use with the conductive trace arrangement of FIG. 6.

Referring now to FIG. 1, transparent force sensing assembly 10 includes force sensor array 11 which is formed from one or more force sensing resistor assemblies such as FSR assemblies 12, 14, 16 and 18. Each FSR assembly is oriented between parallel rows of conductor traces on each substrate such as first traces 19 and second traces 21. A transparent force sensing assembly may be formed using two parallel substrates such as first substrate 22 and second substrate 23.

Referring now to FIGS. 2, 3 and 4, first substrate 22 has parallel conductive traces 19 printed along with a conductive leg such as leg 12A for each FSR assembly such as FSR assembly 12. Second substrate 23 has parallel conductive traces 21 printed along with a conductive leg such as leg 12B for each FSR assembly such as FSR assembly 12. When first substrate 22 and second substrate 23 are properly aligned with the deposited traces and patches in apposition, first conductive traces 19 are oriented perpendicular to second perpendicular traces 21. Near each conductive leg on each substrate, an FSR patch such as patch 24 and patch 25 are deposited. Insulating elements or pads such as insulator pads 26 are deposited on either substrate over the conductive traces at the points where the corresponding conductive trace on the other substrate would be in contact when the substrates are aligned in apposition as illustrated in FIGS. 3 and 4. Insulating elements 26 separate the first conductors from the second conductors.

Controlling the dynamic range, the measured resistance of an FSR circuit as a function of applied force on the sensor, is possible by controlling the size and texture of the conductive patches or electrodes as well as the spacing between the electrodes on the sensor substrates. For example, using the aerosol deposition method to form the electrodes or patches, such as patches 24 and 25 of FIG. 4 or conductors 44 and 48 of FIG. 9, a second layer, layer 27, of small dots or dashes 27A or other shapes over the base conductor electrode may be applied in an effort to emulate the texture of a thick-film silver and FSR deposition. A thick-film FSR has a better dynamic range when used in conjunction with a thick-film silver electrode with few small conductive peaks or spots as opposed to using a "flat" copper trace. Having too many spots or peaks causes the electrode to behave similar to a smooth flat conductor.

Referring now to FIG. 4, first substrate 22 has first conductive traces such as traces 19A and 19B, conductive leg 12A and first FSR patch 24 deposited on a first surface such as conductor surface 22A. Second substrate 23 has second conductive traces such as traces 21A and 21B, conductive leg 12B and second FSR patch 25 deposited on a first surface such as conductor surface 23A. Each substrate has a corresponding second surface such as second surfaces 22B and 23B respectively. When two printed substrates are aligned in parallel, the first surfaces of each substrate are aligned in apposition with the parallel traces on each substrate oriented perpendicular to the conductive traces of the apposing substrate yielding a transparent force sensing assembly such as force sensing assembly 10 with the second surfaces of each substrate operating as a contact surface for the application of force to be detected and measured.

In use, pressure on the second surfaces 22B or 23B of either first or second substrate at or near an FSR assembly such as FSR assembly 12 will create a force sensitive circuit such as circuit 30 of FIG. 5 that extends from first conductive trace 19A to second conductive trace 21A through the three resistive elements described below. First resistive element 32 is formed by the interaction of a portion of second FSR patch 25 with conductive leg 12A. Second resistive element 33 is formed by the interaction of a portion of first FSR patch 24 with second FSR patch 25. Third resistive element 34 is formed by the interaction of a portion of first FSR patch 24 with conductive leg 12B. The resistance value of each resistive element is proportional to the pressure applied to the substrate and the location of the pressure.

Referring now to FIGS. 6, 7, 8 and 9, an array of transparent force sensor assemblies may be formed using two parallel substrates, such as substrates 40 and 41. First substrate 40 has rows and columns of conductive traces such as row traces 42 and column traces 44 formed on first side 40A of the substrate. Where the column traces intersect the row traces, such as intersection point 45, the column traces are interrupted by forming an electrical connection through the substrate from first side 40A to second side 40B and crossing the row trace with a jumper trace such as jumper trace 47 and then again forming an electrical connection such a connection 49 from second side 40B of the substrate to first side 40A of the substrate and reconnecting with interrupted column trace 44.

Alternatively, a dielectric or insulating pad can be printed over the row traces allowing an uninterrupted column trace to be deposited perpendicular to the row traces over the dielectric or insulating pads with a top coat of a suitable conductor such as silver. Parallel to the column traces are short conductor leg traces. On the first side of the second substrate are deposited FSR elements such as patches of conductive material such as CNT. When the substrates are oriented parallel with the first sides in apposition, the patches of the conductive material align over a column trace and a short leg trace such that pressure on the membrane causes one or more conductive patches to engage a column trace and a short leg trace forming a force sensitive resistance circuit.

Figure 8:
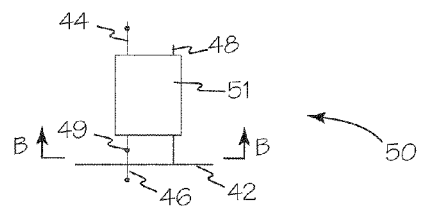
FIG. 8 is a top view of a single force sensor conductive patch and its corresponding traces.
Figure 9:
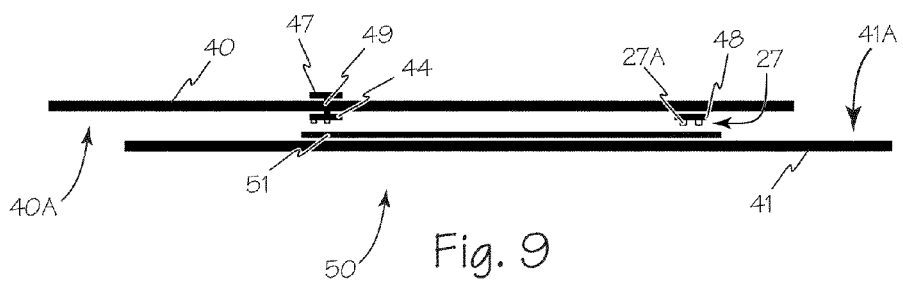
FIG. 9 is a cross-section view of the force sensor of FIG. 8.

Parallel to the column traces are short conductor leg traces such as leg traces 48. An array of force sensing assemblies such as force sensing assembly 50 is formed with an array of patches such as conductive patch 51 are deposited on first side 41A of second substrate 41. FSR elements or patches such as conductive patch 51 include conductive material such as CNT or PEDOT. When substrates 40 and 41 are oriented parallel with first sides 40A and 41A in apposition, the conductive patches such as patch 51 align over an interrupted column trace and a short leg trace as illustrated in FIGS. 8 and 9 to form force sensing assemblies such as force sensing assembly 50. In use, pressure on the membrane causes one or more conductive patches to engage a column trace and a short leg trace forming a force sensitive resistance circuit as discussed above.

Alternatively, substrate 41 may not have a plurality of conductive patches such as patches 51, instead having a single flood layer of conductive material deposited on substrate 41 with the conductive area apposing parallel conductors forming a force sensing assembly.

Figure 10:
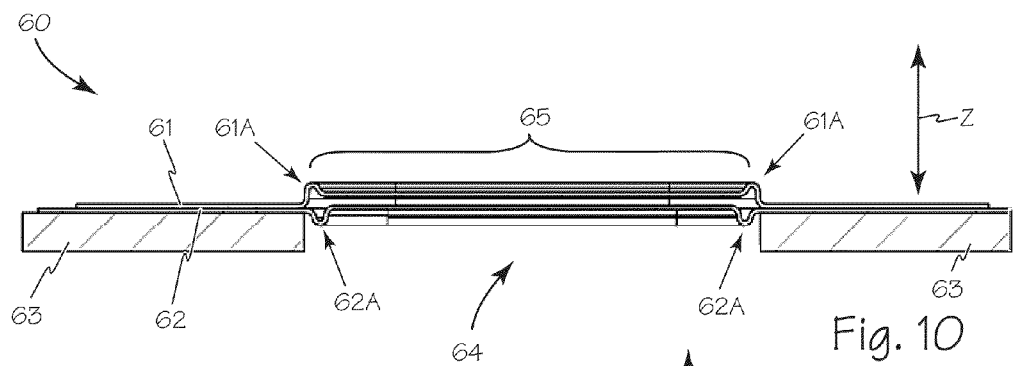
FIG. 10 is a cross-section view of a trampoline force sensor.
Figure 11:
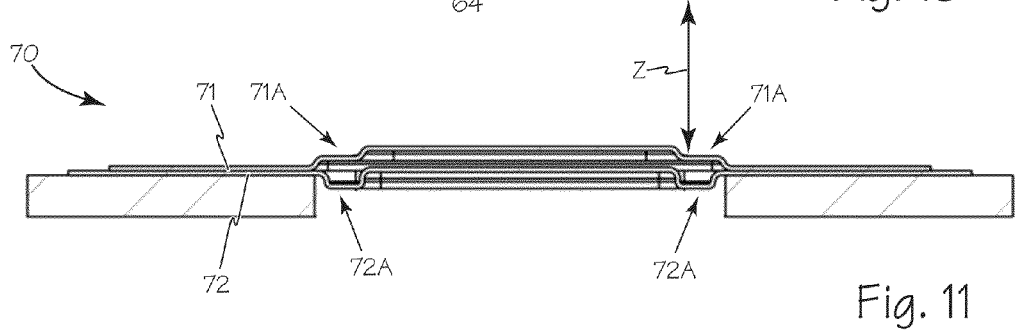
FIG. 11 is a cross-section view of an alternate trampoline force sensor.

Force sensing membranes as discussed, may also benefit from a trampoline configuration such as illustrated in FIGS. 10 and 11. Force sensor 61 is formed with two parallel substrates such as first and second substrates 62 and 63 as discussed above. Each substrate may be planar or may be shaped to form a flexible section such as sections 62A and 63A respectively to optimize sensor movement along the z-axis. Each substrate containing one or more FSR elements such as conductive deposits and or traces to form a force sensing resistor to quantify the location and intensity of force applied to the active area of the sensor. Sensor support 64 includes openings such as opening 65 sized and dimensioned to correspond to active area 66 of force sensor 61.

Force sensor 61 may be formed with the force sensing elements on each substrate oriented to provide many different active areas corresponding to each force sensing element. Multiple openings in sensor support 64 are formed with each opening collocated with a force sensing element.

Force sensor 71 is formed with two parallel substrates such as first and second substrates 72 and 73 as discussed above. Each substrate is shaped to form a flexible section such as sections 72A and 73A respectively to allow sensor movement along the z-axis. Each substrate containing one or more FSR elements such as conductive deposits and or traces to form a force sensing resistor when force is applied to the active area of the sensor.

Figure 12:
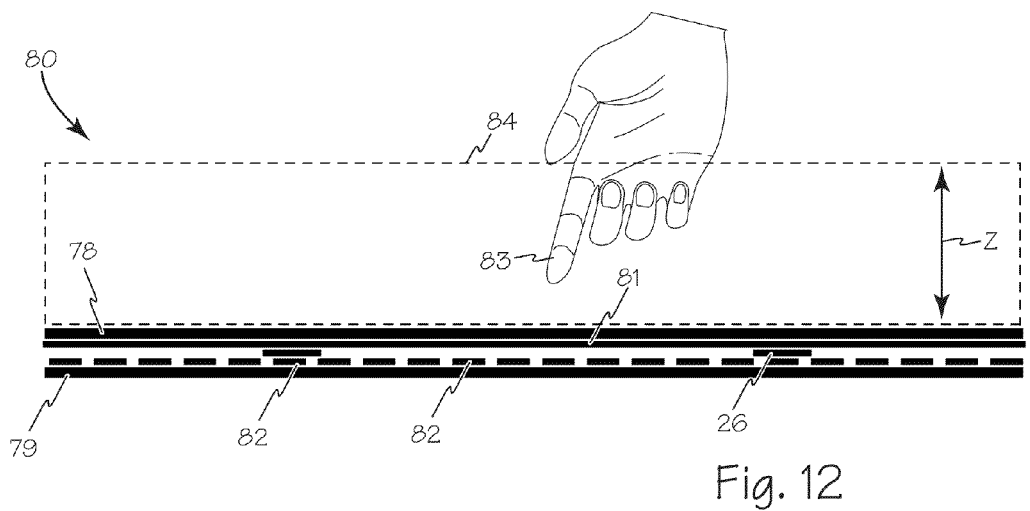
FIG. 12 is a cross-section view of a capacitive force sensor.

Referring now to FIG. 12, First conductive layer 79 and second conductive layer 80 of force sensing resistor 81 may also be used as elements of a capacitive sensor to sense the presence and location of a user's hand, finger or other conductive appendage along the z-axis. Conductive area 82 is deposited on first conductive layer 79 and conductive traces 83 are deposited on second conductive layer 80 to form a force sensing resistor. A voltage applied across the conductive layers creates a capacitive sensor reactive to a conductive appendage such as finger 84 in sensor space 85.

Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

I claim:

1. A force sensing assembly comprising:
   a generally planar first substrate having a conductor surface and an opposing touch surface;
   a plurality of parallel conductive traces on the conductive surface of the first substrate;
   an array of conductive patches oriented between adjacent parallel conductive traces and electrically connected to the conductive traces on the conductive surface of the first substrate;
   a generally planar second substrate having a conductor surface and an opposing touch surface;
   a plurality of parallel conductive traces on the conductive surface of the second substrate;
   an array of conductive patches oriented between adjacent parallel conductive traces and electrically connected to the conductive traces on the conductive surface of the second substrate;
   wherein the first substrate and the second substrate are oriented parallel to each other with the conductive surfaces of each substrate in apposition and the plurality of parallel conductive traces on the first substrate oriented perpendicular to the plurality of conductive traces on the second substrate; and
   a plurality of insulating pads secured on the conductive traces on the first substrate where the perpendicular traces of the second substrate intersect the traces of the first substrate.

2. The force sensing assembly of claim 1 wherein the arrays of conductive patches are formed of at least two layers of conductive material.

3. The force sensing assembly of claim 2 wherein the arrays of conductive patches are formed of conductive material selected from the group comprising:
   carbon allotropes, conductive polymers or metal oxides.

4. The force sensing assembly of claim 2 wherein the arrays of conductive patches are formed of graphene.

5. The force sensing assembly of claim 2 wherein the arrays of conductive patches are formed of Poly(3,4-ethylenedioxythiophene).

6. The force sensing assembly of claim 2 wherein the arrays of conductive patches are formed of indium tin oxide.

* * * * *